O. V. WOOD.
Carpet-Stretcher.
No. 220,324. Patented Oct. 7, 1879.
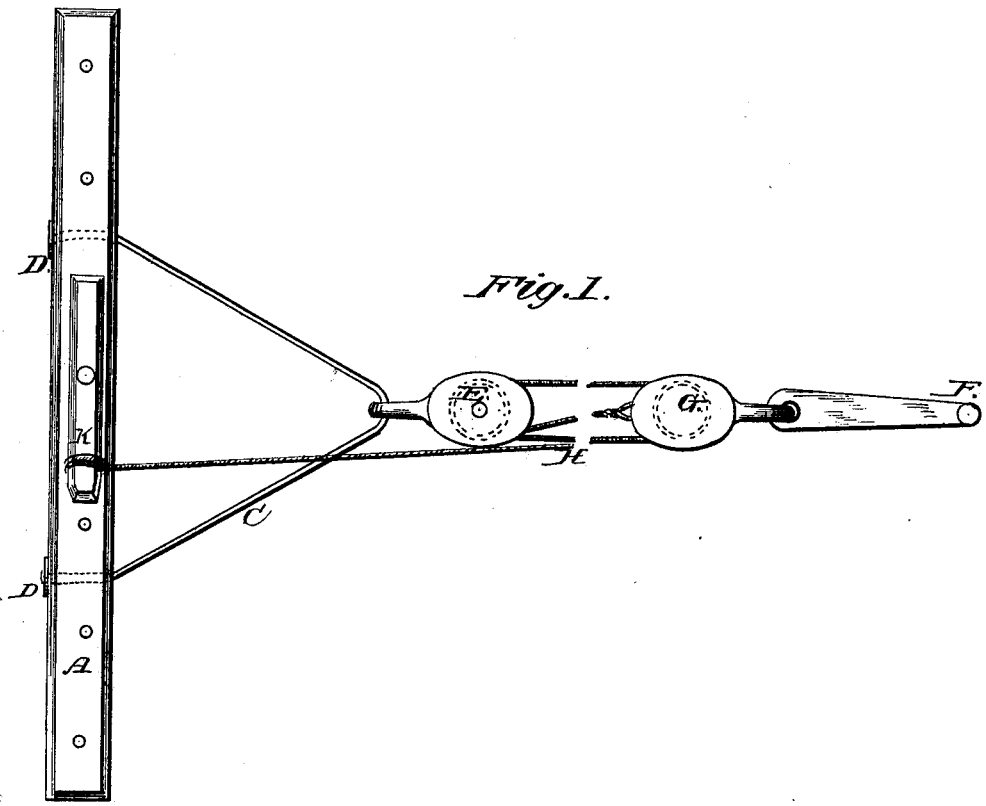
Fig. 1.
Fig. 2.
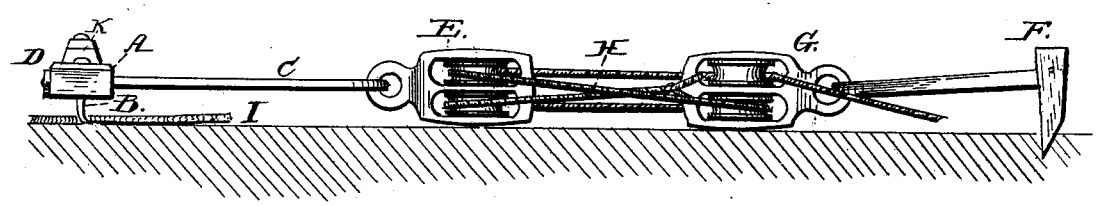
Witnesses
Fred G. Dietrich
P. C. Dietrich
Inventor
Oscar V. Wood
by Daniel Breed
Atty.

UNITED STATES PATENT OFFICE.

OSCAR V. WOOD, OF FOSTORIA, OHIO.

IMPROVEMENT IN CARPET-STRETCHERS.

Specification forming part of Letters Patent No. 220,324, dated October 7, 1879; application filed September 3, 1879.

*To all whom it may concern:*

Be it known that I, OSCAR V. WOOD, of Fostoria, in the county of Seneca and State of Ohio, have invented certain new and useful Improvements in Carpet-Stretchers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In the drawings, Figure 1 is a top view of my improved carpet-stretcher. Fig. 2 is a side view of the same.

My invention consists of a novel construction and combination of devices for multiplying the power in stretching carpets, all of which will be understood by the accompanying description.

I make a drag-bar, A, of suitable length, and provide the same with hooks B for seizing the carpet. This bar has a V-shaped equalizing-clevis, C, the ends of which pass through the bar A, and, receiving washers D, are well riveted, so as to bear the strain of stretching the carpet. The forward angle of the clevis is passed through the eye of the pulley-block E before riveting. The bar is also provided with a catch, K, for tying the rope, as seen in Fig. 1. The pulley-blocks E and G are connected by the rope H in the usual way, and the spur or dog F is permanently attached to the eye of the pulley-block G, so that the whole forms one apparatus entirely inseparable.

Operation: The hooks B are inserted into the carpet I, as shown in Fig. 2, and the spur or dog F is driven into the floor. Then by pulling the cord H, in the usual manner, the carpet is easily stretched, when the rope is tied to catch K, Fig. 1.

I do not broadly claim a tackle of pulley-blocks or the separate devices above described; but, Having fully described my invention, what I claim is—

1. The combination of the drag-bar A, having hooks B and equalizing-clevis C, with the pulley-blocks E and G and the rope H, substantially as set forth.

2. The combination of the bar A, provided with hooks, the pulley-blocks, and rope with the spur or dog F, substantially as set forth.

In testimony that I claim the foregoing I have hereunto set my hand this 27th day of August, 1879.

OSCAR V. WOOD.

Witnesses:
E. C. TINGLE,
J. BOWER.